United States Patent
Mahanta et al.

(10) Patent No.: US 11,403,347 B2
(45) Date of Patent: Aug. 2, 2022

(54) AUTOMATED MASTER DATA CLASSIFICATION AND CURATION USING MACHINE LEARNING

(71) Applicant: SAP SE, Walldorf (DE)

(72) Inventors: Prabal Mahanta, Bengalore (IN); Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 346 days.

(21) Appl. No.: 16/737,338

(22) Filed: Jan. 8, 2020

(65) Prior Publication Data
US 2021/0209159 A1      Jul. 8, 2021

(51) Int. Cl.
| | | |
|---|---|---|
| *G06F 16/00* | (2019.01) | |
| *G06F 16/906* | (2019.01) | |
| *G06N 20/00* | (2019.01) | |
| *G06Q 10/06* | (2012.01) | |
| *G06F 16/901* | (2019.01) | |

(52) U.S. Cl.
CPC ........ *G06F 16/906* (2019.01); *G06F 16/9024* (2019.01); *G06N 20/00* (2019.01); *G06Q 10/067* (2013.01); *G06Q 10/0633* (2013.01)

(58) Field of Classification Search
CPC .. G06F 16/901; G06F 16/906; G06F 16/9024; G06N 20/00; G06N 5/02; G06Q 10/0633; G06Q 10/067
See application file for complete search history.

(56) References Cited

U.S. PATENT DOCUMENTS

| | | | | |
|---|---|---|---|---|
| 10,176,427 | B2* | 1/2019 | Dubey | .............. G06F 16/35 |
| 2015/0339572 | A1* | 11/2015 | Achin | .............. G06N 20/00 |
| | | | | 706/46 |
| 2017/0006135 | A1* | 1/2017 | Siebel | .............. H04L 67/12 |
| 2017/0161336 | A1* | 6/2017 | Dubey | .............. G06F 16/185 |
| 2017/0351956 | A1* | 12/2017 | Dubey | .............. G06F 16/2228 |
| 2018/0046926 | A1* | 2/2018 | Achin | .............. G06N 20/20 |
| 2018/0350006 | A1* | 12/2018 | Agrawal | .............. G06F 7/026 |
| 2020/0293564 | A1* | 9/2020 | Reh | .............. G06F 16/36 |

* cited by examiner

*Primary Examiner* — Shiow-Jy Fan
(74) *Attorney, Agent, or Firm* — Buckley, Maschoff & Talwalkar LLC

(57) ABSTRACT

A business data database may store transaction business information of an enterprise along with existing structures, rules, and classification recommendations. A business rules framework agent platform may execute supervised machine learning and generate industry agnostic relationship scores and classification scores based on data in the business data database. The business rules framework agent platform may then optimize data and table structures, using relation graph-based evaluation, in accordance with taxonomy data and the classification scores. A rules and configuration database may store the optimized data and table structures from the business rules framework agent platform. Further, a business configuration and rules mapper platform may identify business configuration data and business rules classification data based on the optimized data and table structures. In some embodiments, the identified business configuration data and business rules classification data are used to automatically update the existing structures, rules, and classification recommendations in the business data database.

19 Claims, 13 Drawing Sheets ial record for each entity represented in the database. Such a goal might be associated with, for example, a master data management program.

AUTOMATED MASTER DATA CLASSIFICATION AND CURATION USING MACHINE LEARNING

BACKGROUND

A business or enterprise may store information about various entities in the form of electronic records. For example, a company might have a customer database where each row in the database represents a record containing information about a particular customer (e.g., the customer's name, address, billing information, and purchase history). Moreover, different electronic records may actually be related to a single entity. For example, a first record for "Customer" and a second record for "Customer, Inc." might both be associated with the same customer. In some cases, it may be desirable to consolidate multiple records to create a "master" data store that contains a single electronic record for each entity represented in the database. Such a goal might be associated with, for example, a master data management program.

The consolidation process in a master data management program may be a time consuming and error prone operation. For example, an algorithm might review records looking for potential duplicates. When a potential duplicate is found, the algorithm or human operator might determine the best way for the information to be combined. In some cases, master data in an industry or application may be modelled and defined for transactional data (e.g., transactions between customers and an enterprise). Such transactional data may have different structures and traits that define master data. This may create a challenge when it comes to the integration of various applications across a business landscape.

For example, there may be no strategy to automate the process or intelligent way to verify if any transactional data should become master data. In the case of poor customer data, no approach may classify the data into logical cohorts without manual effort. With Internet of Things ("IoT") data, the overall complexity of the problem increases substantially and the modelling of data and appropriate schema become even more important.

Data quality and validation is currently done with a traditional manual approach. There is no easy scaling which can lead to redundancy of data and structures governing the same. Even when a centralized approach of removing data silos is attempted, there is no consolidation due to lack of business users in a modelling stage. Currently, enterprises lack organizational semantic consistency and a business user's consortium. The management master data presents the following challenges:

business analytics for decisions requires quality and stable data,
the cost of maintaining consistent master data and avoiding multiple replicas,
validation of master data,
testing master data quality and structure, and
a standard process to govern master data.

A big challenge in master data management is that is lacks a core process for data classification and discretization at all transactional levels. The process of converting transactional data attributes to a finite compartmentalized set is not without a loss of information. Some approaches attempt minimal loss of information using univariate, multivariate, supervised discretizers and a splitting versus merging approach. However, an enterprise cannot apply the discretizers without doing a manual evaluation of the model and may end up with a huge task of making the data model and information scalable (and not change due to a change in the business model) which may again lead to custom development for optimizing the data model.

Master data quality may be a major factor and requirement for a business model, and it may be critical to help reducing data cost and a model penalty (making it a complex parameter to determine). As a result, discretization may be a critical function and classification errors and discretization intervals can be a challenging technical problem. In some cases, there may be a requirement to optimize on the path of arrival of the decision on which factors to weigh as parameters to the discretization models—be it classification errors or intervals. Hence, the problem may be redefined to understand the trade-off and how an enterprise can do this trade-off evaluation automatically with human guided knowledge supported by a machine assisted workflow. It would therefore be desirable to provide master data classification and curation using machine learning in a more efficient and effective manner.

SUMMARY

In some embodiments, a business data database may store transaction business information of an enterprise along with existing structures, rules, and classification recommendations. A business rules framework agent platform may execute supervised machine learning and generate industry agnostic relationship scores and classification scores based on data in the business data database. The business rules framework agent platform may then optimize data and table structures, using relation graph-based evaluation, in accordance with taxonomy data and the classification scores. A rules and configuration database may store the optimized data and table structures from the business rules framework agent platform. Further, a business configuration and rules mapper platform may identify business configuration data and business rules classification data based on the optimized data and table structures. In some embodiments, the identified business configuration data and business rules classification data are used to automatically update the existing structures, rules, and classification recommendations in the business data database.

Some embodiments comprise: means for receiving, at a business rules framework agent platform, information from a business data database that stores transaction business information of the enterprise along with existing structures, rules, and classification recommendations; means for executing, by the business rules framework agent platform, supervised machine learning to generate industry agnostic relationship scores and classification scores based on the received information; means for optimizing, by the business rules framework agent platform using relation graph-based evaluation, data and table structures in accordance with the taxonomy data and the classification scores; means for storing the optimized data and table structures in a rules and configuration database; means for identifying, by a business configuration and rules mapper platform, business configuration data and business rules classification data based on the optimized data and table structures; and means for using the identified business configuration data and business rules classification data to automatically update the existing structures, rules, and classification recommendations in the business data database.

Some technical advantages of some embodiments disclosed herein are improved systems and methods to provide master data classification and curation using machine learning in an efficient and effective manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
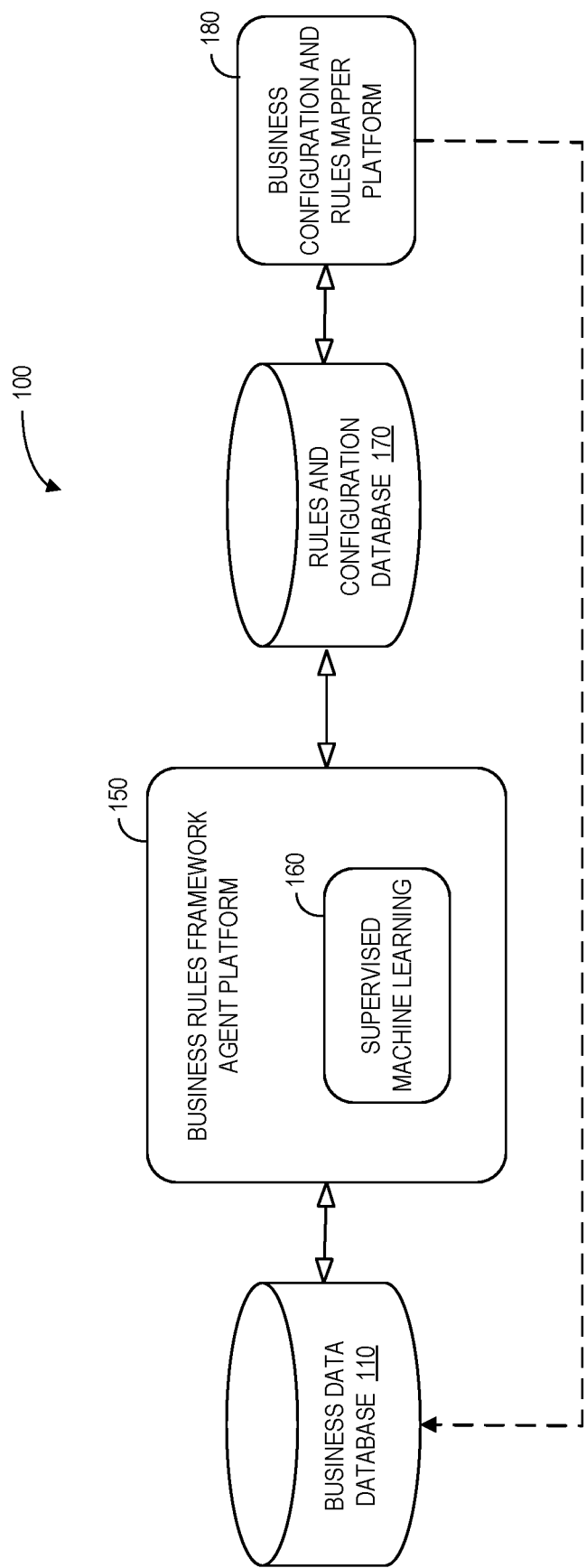
FIG. 1 is a high-level system architecture in accordance with some embodiments.

FIG. 1 is a high-level system 100 architecture in accordance with some embodiments. The system 100 includes a business data database 110 (e.g., storing transactional business information), a business rules framework agent platform 150 (including supervised machine learning element 160), a rules and configuration database 170, and a business configuration and rules mapper platform 180. As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The supervised machine learning element 160 may store information into and/or retrieve information from various data stores, which may be locally stored or reside remote from the supervised machine learning element 160. Although a single supervised machine learning element 160, business rules framework agent platform 150, etc. are shown in FIG. 1, any number of such devices may be included. Moreover, various devices described herein might be combined according to embodiments of the present invention. For example, in some embodiments, a business rules framework agent platform 150 and business configuration and rules mapper platform might comprise a single apparatus. The system 100 functions may be performed by a constellation of networked apparatuses, such as in a distributed processing or cloud-based architecture.

According to some embodiments, an operator or master data steward may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations, alerts, or results from the system 100.

Figure 2:
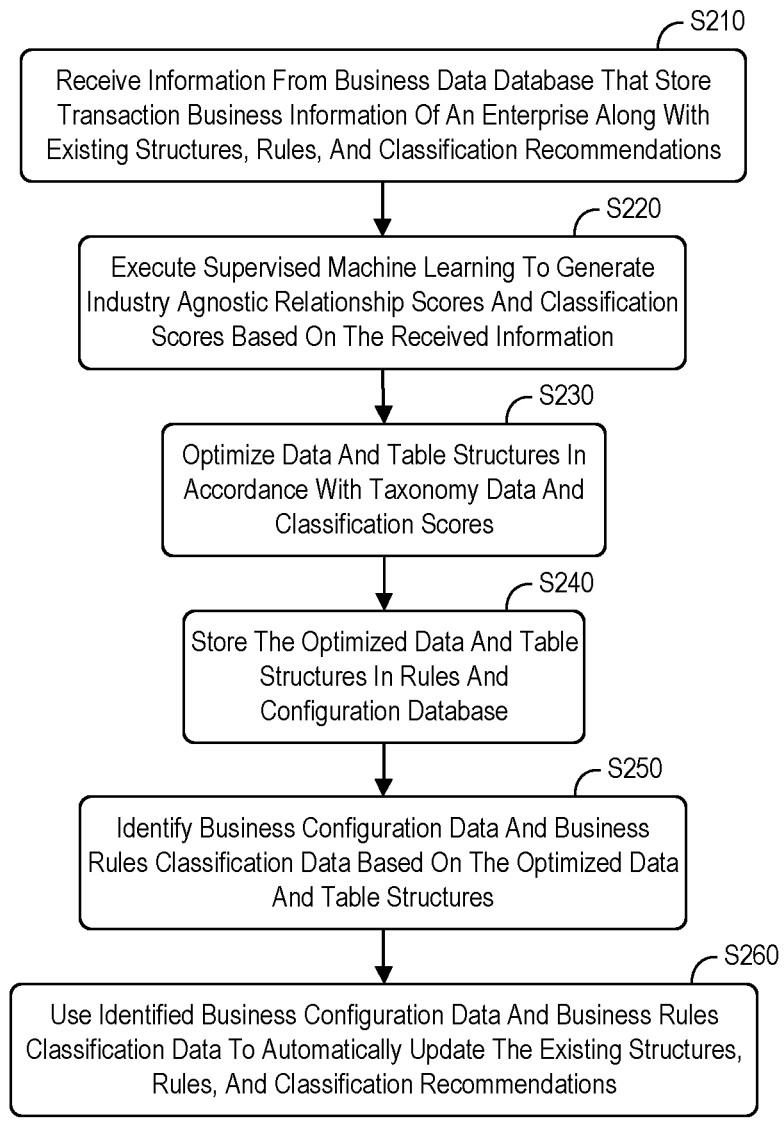
FIG. 2 is a method according to some embodiments.

FIG. 2 is a method that might be performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a business rules framework agent platform may receive information from a business data database that stores transaction business information of the enterprise along with existing structures, rules, and classification recommendations. The transaction business information may be associated with "master data" of the enterprise. As used herein, the phrase "master data" may refer to any type of business object that contains valuable, agreed upon information shared across an organization (including, for example, relatively static reference data, transactional data, unstructured data, analytical data, hierarchical data, metadata, etc.).

At S220, the business rules framework agent platform may execute supervised "machine learning" to generate industry agnostic relationship scores and classification scores based on the received information. As used here, the phrase "machine learning" may refer to algorithms and/or statistical models that computer systems use to perform specific tasks without using explicit instructions (including, for example, artificial neural networks, decision trees, support vector machines, regression analysis, Bayesian networks, genetic algorithms, etc.).

At S230, the business rules framework agent platform (using relation graph-based evaluation) may optimize data and table structures in accordance with the taxonomy data and the classification scores. At S240, the optimized data and table structures may be stored in a rules and configuration database. At S250, a business configuration and rules mapper platform may identify business configuration data and business rules classification data based on the optimized data and table structures. Using the identified business configuration data and business rules classification data, the system may automatically update the existing structures, rules, and classification recommendations in the business data database at S260.

Figure 3:
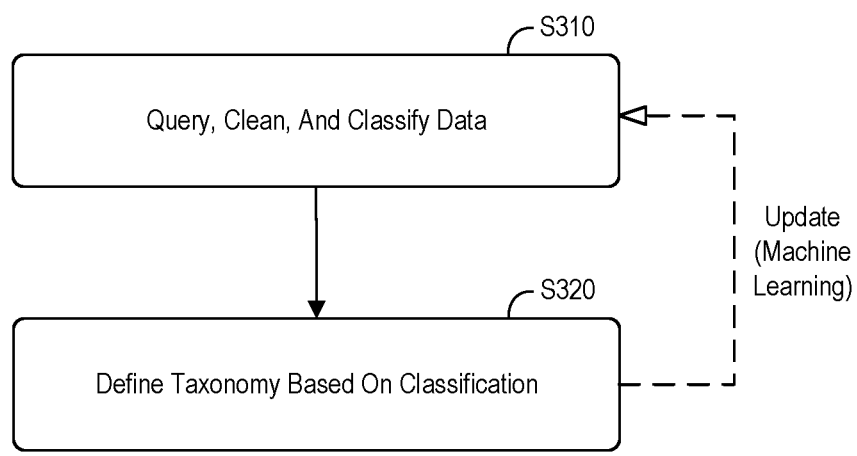
FIG. 3 is a high-level master data task process in accordance with some embodiments.

Thus, embodiments may provide an apparatus to classify transactional-master data, curating a classification structure with data quality and a scalable approach to manage stability in the master data. FIG. 3 is a high-level master data task process in accordance with some embodiments. The key tasks for master data may be handled with human enabled and machine guided approaches. At S310, the system may query, clean, and classify transaction data. At S320, the system may define a taxonomy based on classifications. The transaction information may then be updated (e.g., in connection with machine learning) and the process may continue at S310 (as illustrated by the dashed arrow in FIG. 3). If an enterprise is able to conserve data quality, then it may deliver business optimizations such as: a stable management scheme for master data; a scalable and machine aided mechanism to preserve data cost and penalty scores, etc.

Figure 4:
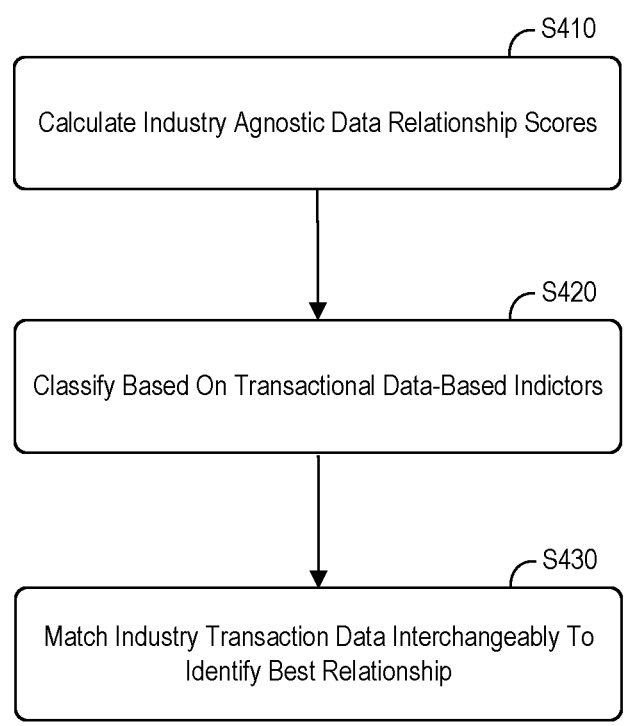
FIG. 4 shows elements of a new master data paradigm according to some embodiments.

FIG. 4 shows elements of a new master data paradigm according to some embodiments. To achieve business requirements, an enterprise may implement an industry agnostic data relationship score at S410. At S420, a transactional data-based indicator classification may be implemented. Moreover, at S430 the system may match industry transaction data interchangeably to identify best relationships. Embodiments may look into a new paradigm in the area of master data, and learn from existing structures, rules, classification recommendations, processes, etc. to build a scoring mechanism that understands the master data evolution and (over a period of time) start to structure and update classifications to reduce data cost and penalty scores. The system may achieve a dynamic, holistic model where business master data is optimized, defined, and updated with a structure (e.g., associated with bill of material data) being renovated using transactional data and classification scores. To achieve learning and training of transaction data, embodiments may utilize a resilient distributed dataset and directed acyclic graph approach to perform the actions. The system may approach the architecture of this approach after the solution architecture as a side car approach to achieve the implementation of the whole idea.

Some embodiments may utilize a business rules framework agent to get business rules from any defined source or framework. The agent may write the path back to the side car as mentioned. The write function of the agent is to the side car database implementation. Data and table structures may be optimized based on any update in the taxonomy and classification score. The first step for any business rules classification may be to understand the configurations and, based on that, which rules will be mapped to the industry of interest. A business configuration and rule mapper may then utilize this configuration using supervised learning mode to build rules for mappers and use relation graph-based evaluations to determine relations for any industry of interest.

Figure 5:
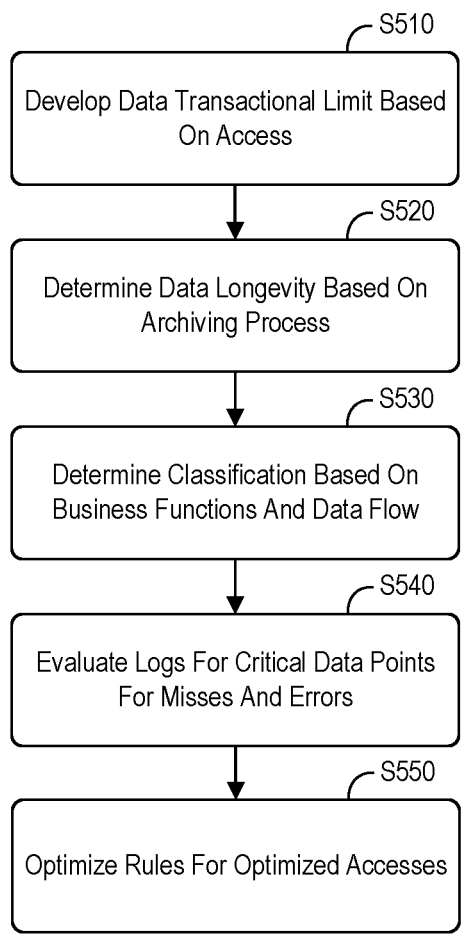
FIG. 5 is a substantially real-time assessment taxonomy process in accordance with some embodiments.

FIG. 5 is a substantially real-time assessment taxonomy process in accordance with some embodiments. A real time assessment and scoring may utilize data that is classified and using graphs in which the types are aligned to the taxonomy as follows. At S510, an enterprise may develop a data transactional limit based on access. At S520, the longevity of the data may be determined based on an archiving process. At S530, the system may determine classifications based on business functions and a data flow. Logs may then be evaluated at S540 for any critical data points associated with misses and/or errors. At S550, the system may optimize rules to provided optimized accesses. To develop or optimize the outcomes of the system, it may be required that a business process management system acts as a focal point of defining and orchestrating business workflows. The optimizations may overcome long latency due to semi-structured or ad-hoc process management. In some cases, every organization may have a framework where business analytics are assessed and rules and related frameworks are managed. The agents in the architecture may parse the rules and score them in terms of structure from a process point of view and evaluate the task automation design with a design score. As a result, analysis in this module not only contributes back to the overall task resolution but also to the optimization of the design of workflows managed in the business rules framework.

Figure 6:
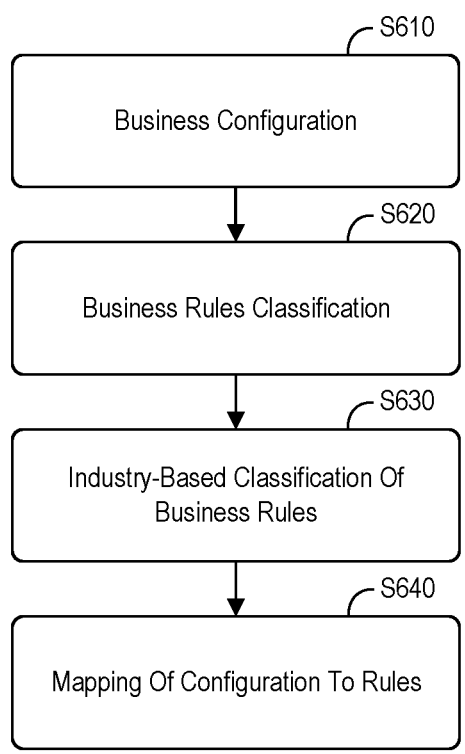
FIG. 6 is an identification training process according to some embodiments.

Some embodiments may utilize a business configuration and rules mapper. For example, FIG. 6 is an identification training process according to some embodiments. As previously described, the agent for the business rules framework may write back to the database. Subsequently, the rules and configuration mapper may train to identify: business configurations S610, business rules classifications S620, industry-based classifications of business rules S630, and mappings of configurations to rules S640. All of the business rules for any industry requirement may have a configuration setup. Based on the configuration rules may be modeled into knowledge management, and hence workflows, which then transitions them into business process automations. It may be important to understand workflows because workflow output may produce business results which are responsible for business decisions. It may also be important how this component interacts with the master data and how it defines the structure and classification of the master data. The rules and configuration as a whole may, for example, impact the supply chain. a bill of material, etc.

Some embodiments may utilize a data classifier to create a scoring model based on the observations and an algorithm score for each successful retrieval and classification. Monitoring sources may feed log data and also help the system identify and classify issues for optimization purposes. Note that domain models may be a key stakeholder in the system. Here, industry models and also the need for customer requirements may be modelled. This might comprise, for example, a JavaScript Object Notation ("JSON") repository for a customer data model of a specific industry accumulated to better understand the data and also any associated optimizations.

For governance scoring, the system may need to understand the classification of data in two sectors: intrinsic and contextual. Now, based on the following factors, the system may decide the data quality and act on the scoring mechanism based on the weights for each category:

Accuracy (A)—Business case outcome achievement rate,
Organization (O)—Business case relevance rate,
Completeness (C)—Rate of missing data count for a structure,
Usable-ness (U)—Business case mapping count, Level of detail (L)—BOM Traversal levels for a business case, and Platform query latency (P)—the lowest millisecond (ms) unit consideration and all conversions are made to the lowest unit, and Domain score (D)—as explained in connection with a domain scorer.

The system may define the equations for the above parameters which then form the core of the scoring module. To determine the equations, one requirement may be to understand that all the weights are important from a technology and industry relevance perspective. As per industry, the weights ($w_1$ to $w_7$) might be configured and/or learned and applied to the Data Quality Score ("DQS") scoring mechanism:

$$DQS=(w_1*A)+(w_2*O)+(w_3*C)+(w_4*U)+(w_5*L)+(w_6*P)+(w_7*D)$$

Based on the classification done by the system, the monitoring elements may observe the business actions and then, based on the success of a business function, models may be staged to databases using labels to provide abstraction.

Figure 7:
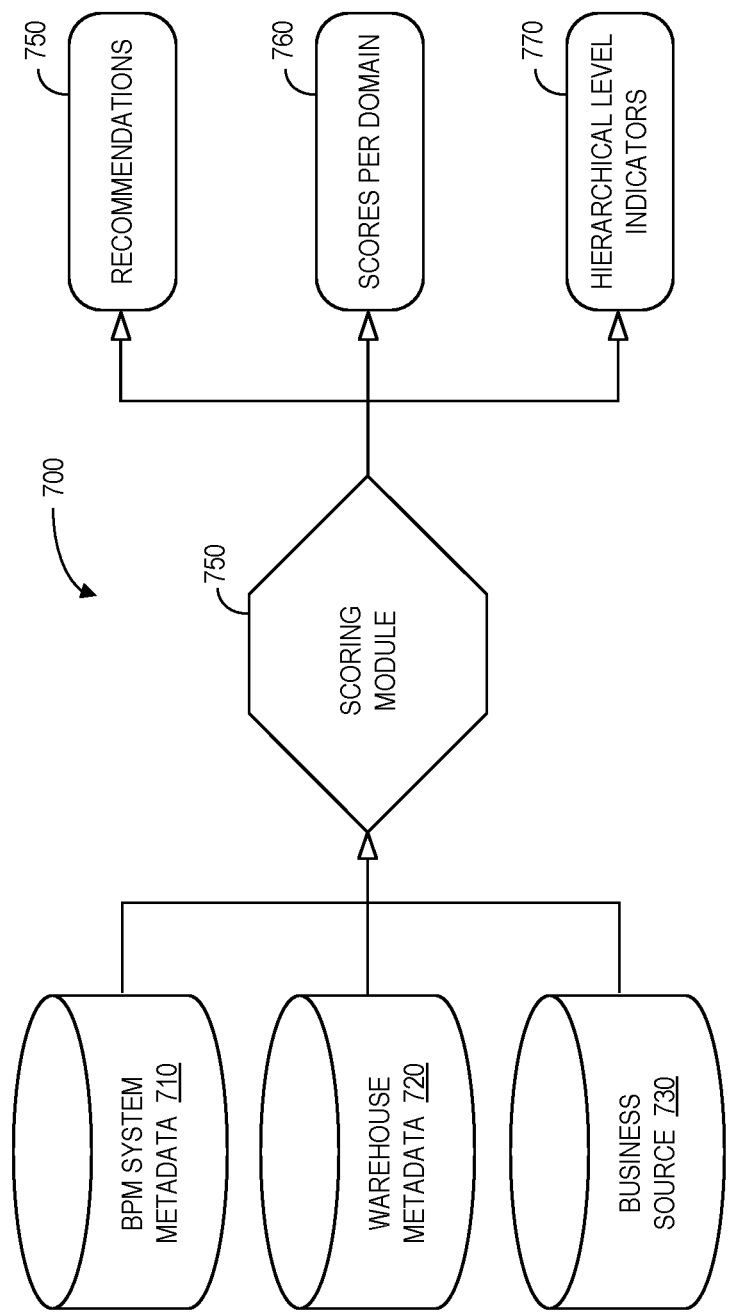
FIG. 7 is a domain scorer platform architecture in accordance with some embodiments.

Some embodiments may utilize a domain scorer and domain specific values can now be defined using business profiling using parameters which can be explored for this module. For processing scores, it may be required that the data under evaluation is critical. FIG. 7 is a domain scorer platform architecture 700 in accordance with some embodiments. A scoring module 750 may receive a metadata evaluation of Business Process Management ("BPM") data 710, a metadata evaluation of warehouse data 720, and any other business source data 730. According to some embodiments, the scoring module 750 further receives a metadata evaluation of monitoring routines. The scoring module 750 may be configured to output recommendations 750, scores (per domain) 760, hierarchical level indictors 770, etc. Hence, the architecture 700 of a domain scorer may be evolved from the business requirement as per the evolution of the business rules and configuration.

Some embodiments may utilize a data governance module. From an organization scenario, it may be important that there is a setup for data governance to provide a foundation for precision for Artificial Intelligence ("AI") and machine learning scenarios. To achieve this, an enterprise may come up with a critical scenario of evaluation which covers: data lineage and anomaly detection. This might comprise a critical piece of the implementation since it may allow data to be free of bias. The governance module may use a critical set of algorithms to determine lineage, detect anomalies, and rectify an overall use case. With the expected outcomes, the governance module may also try to score the data using the following parameters: usage, conformance to a set of rules, and provenance. This score may then be evolved to multiple scenarios to govern the master data (as well as using the scoring module).

Some embodiments may utilize a labelling module to help identify master data structure changes. The core of this module is to identify semantic similarity and cluster the information around a concept. This may lead to a set of labels and/or identify a change that is needed to the data model (e.g., an update, modification, or deletion) to better adhere to the business scenarios.

Figure 8:
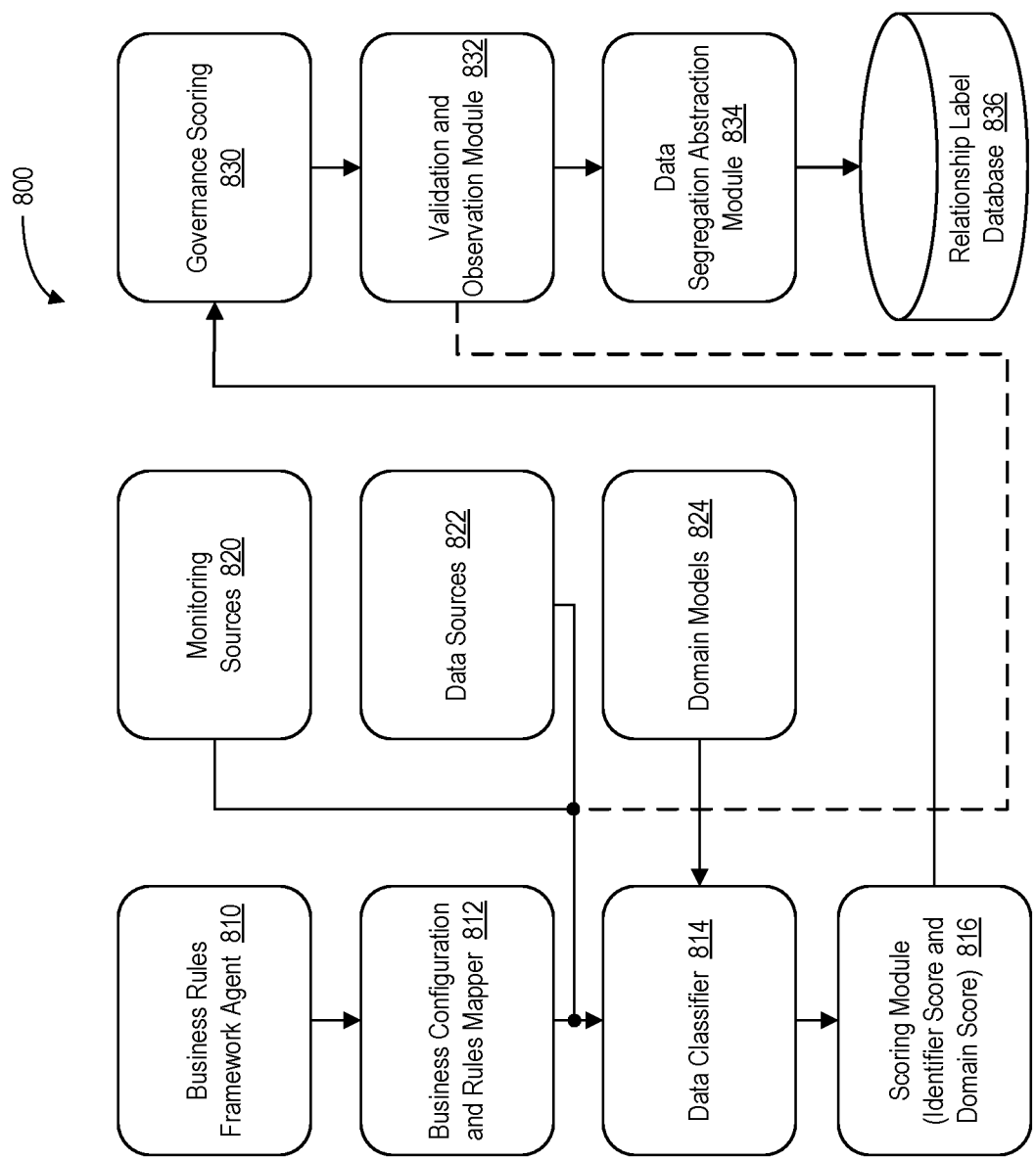
FIG. 8 is an overall architecture according to some embodiments.

Combining all of these elements together, FIG. 8 is an overall architecture 800 according to some embodiments. The architecture 800 includes a business rules framework agent 810, a business configuration and rules mapper 812, a data classifier 814, and a scoring module 816 (e.g., to generate an identifier score, a domain score, etc.). Moreover, monitoring sources 820, data sources 822, and domain models 824 may all provide inputs to the data classifier 814. In addition, governance scoring 830, a validation and observation module 832 and a data segregation and abstraction module 834 may process data from the scoring model 816 (and store a result in a relationship label database 836). In this way, the architecture 800 may help with an understanding of data taxonomy. Note that managing and classifying the quality of master data may be a big challenge.

According to some embodiments, industries may apply the following techniques which take into consideration the data taxonomy and quality governance: a data driven approach, and a process driven approach. The problem with either approach is that even if the system tries to implement it with generic database concepts, it is likely that the solution or problem driven approach will lack quality of the master data. It is also difficult to modify the master data relationships without undergoing a drastic computational cost.

Figure 9:
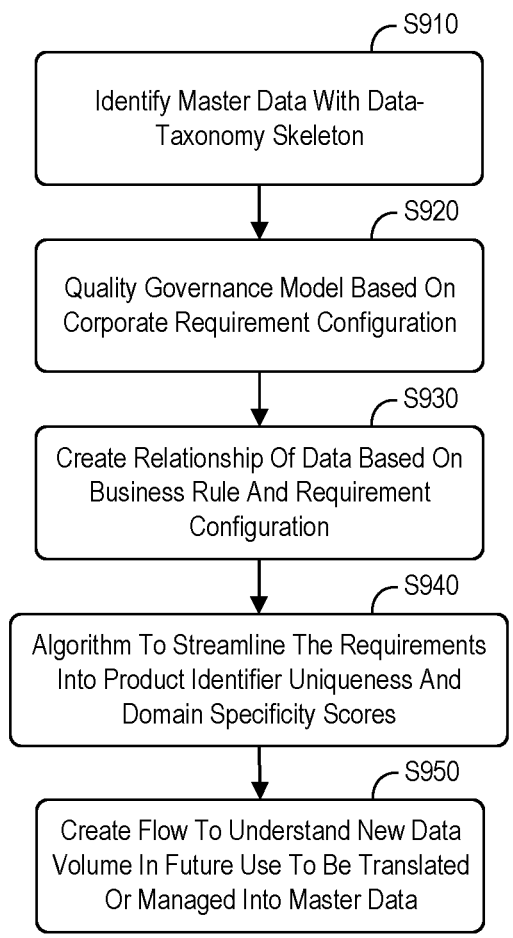
FIG. 9 is a key issue identification process in accordance with some embodiments.

FIG. 9 is a key issue identification process in accordance with some embodiments. The process may help identify the key issues that relate to master data management and also hierarchy traversals where the system takes into consideration key elements. At S910, the system may identify master data with a data-taxonomy skeleton. A quality governance model may then be implemented at S920 based on a corporate requirement configuration. At S930, the system may create relationships of the data based on business rules and requirement configurations. At S940, an algorithm may be applied to streamline the requirements into a product identifier uniqueness score and/or domain specificity score. The system may then create at S950 a flow to understand a new data volume (in future use) to be translated or managed into the master data.

According to some embodiments, the framework may include a data taxonomy-based domain and metadata classification module, a governance rule optimizer module, a business configuration-based processor module, a scorer module, a graph-based relationship classifier module, and a data volume and frequency calculator module. Using these modules, an architecture may resolve aspects of quality governance required for master data and also provide a hierarchy traversal framework for query optimizations. Such an approach may be applied to any of the generic implementations of any application to carry out the classification, be it a structured data or a set of unstructured but critical master data that has yet to be classified.

Taking all the aspects into consideration, the system may set up taxonomy analytics which can classify very easily the transactional data and then further classify the metadata. At this point, the framework might not mark un-classified data as "master" data and may also reference its stability and consistency from a volume perspective (e.g., over a million update/delete based operations). After this analysis, the framework may make certain decisions for scoring, such as governance scoring, identifier scoring, domain specificity scoring, etc.

The framework may score the identifier with an index, but for governance and domain it may score it a null and then initialize the analysis based on the configurations for both business and requirement configuration inputs provided to the framework. Such an approach may provide a requirement configuration and also a business configuration enabled by the framework using a template. The business case template might be based on, for example, a business rules model, a domain model, configurations, etc.

Figure 10:
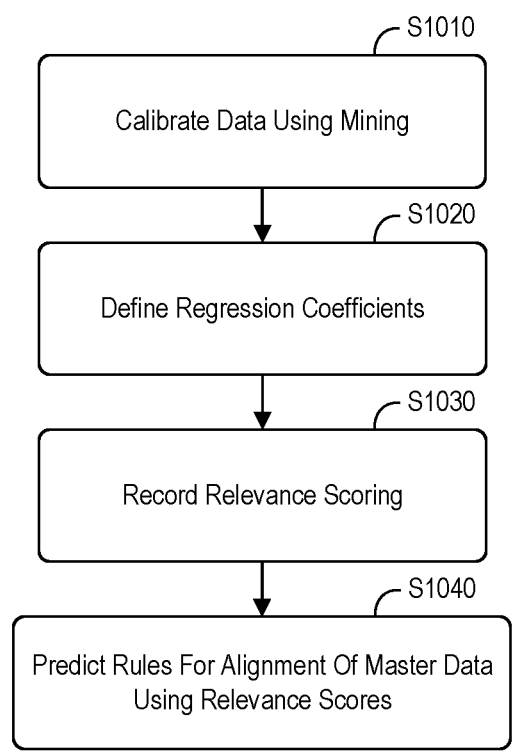
FIG. 10 is taxonomy definition process according to some embodiments.

According to some embodiments, a taxonomy of data may be defined. To define the taxonomy of transactional data (and deduce the relevance of the data) the system may need to achieve a relevance index which can be defined as a metric to measure relevance. In context of the idea, the system might use the algorithm of FIG. 10 to identify relevance. Note that structural metadata may defined in accordance with the data structure that is available. The structural metadata, if enhanced, is accommodated by the data structure either by enhancement or extension. At S1010, the system may calibrate the data using mining At S1020, regression coefficients may be defined and relevance scoring may be recorded at S1030. At S 1040, the system may predict rules for alignment to the master data using the relevance score.

Note that S1010 might be implemented as follows:
R→Rules R∈SR
U→Users U∈SU
Re→Relationship Re∈SRe
TO→Transactional Objects TO∈STO
With Each Rule R in SR
Check Relation Re in SRe
   Identify Transactions TO in STO
     Identify Re from Data Model Repository
     Rank Transaction as RU
     Compare Ranks and Arrange Ranking RU∈SRU Each outcome from the above algorithm may result in a bipartite network which would be function of R, U, Re, and TO which is represented as:

$$F(R,U,Re,TO) = \text{Mean}(RU \in SRU)$$

Once the mean is achieved, the system may take the higher ranked items to be considered for data models for master data. This is an iterative process and each iteration may result in a mean which will move towards the peak of the transactional data ranks. Hence, this will be a clear indicator of the minimal consideration for master data enhancements.

Figure 11:
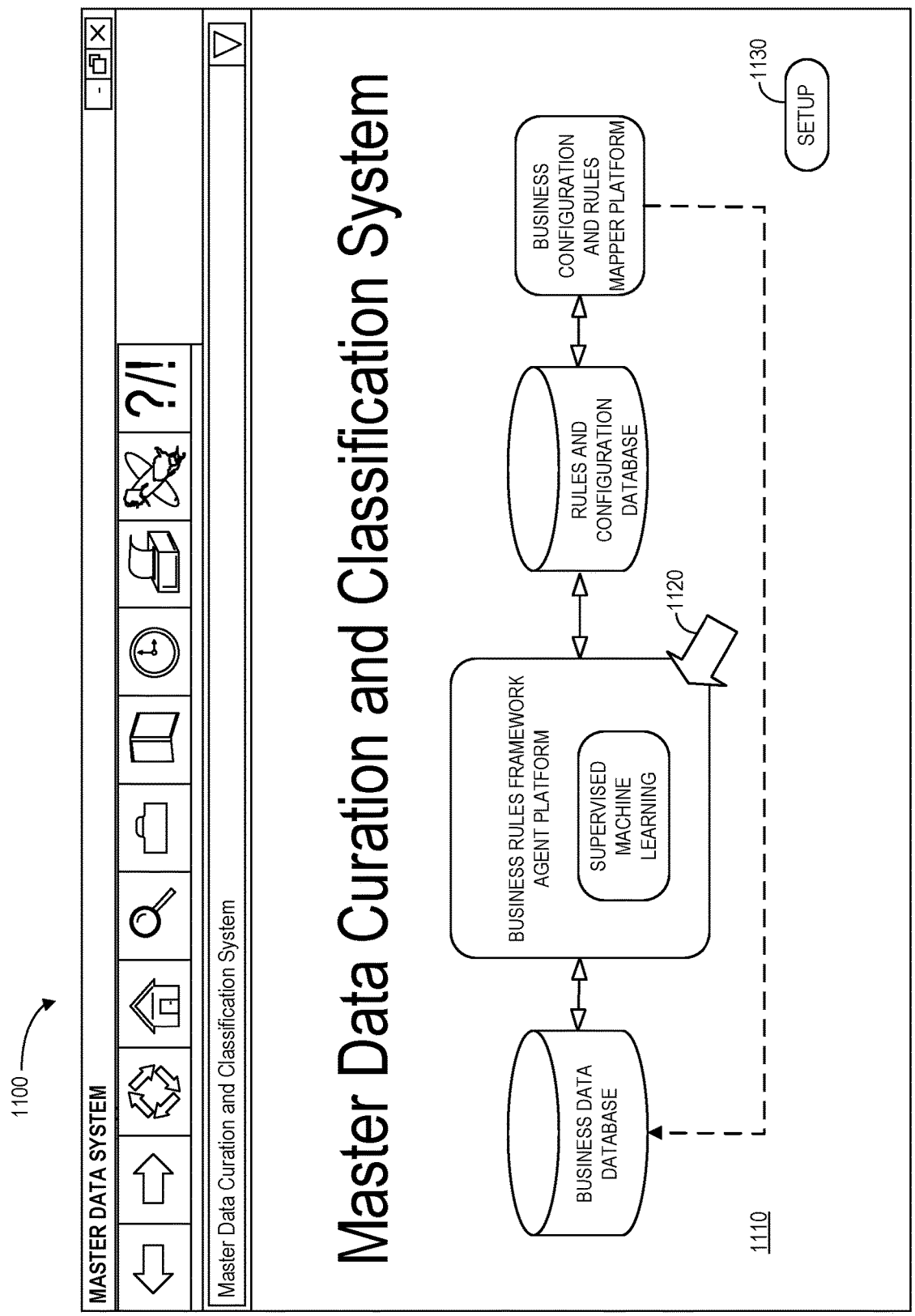
FIG. 11 is a human machine interface display in accordance with some embodiments.

For calculating the longevity of data, the system may calculate the mortality rate of the data and classify master data (from the point of view of the last access):
If
Age of Access—$A_t$
Initial Age of Access—$A_i$
frequency of access $(F_a)$=Age of Access $(A_t)$/Initial Age of Access $(A_i)$
If Archival rate of the data→$A_r$ $$\ln(A_t/A_i) = -E(A_r)$$

where E represents exponential function to the power of $A_r$, that is the archival rate of data, and logarithmic function of frequency will provide us the mortality rate of the date which is equivalent of the archival rate of the data According to some embodiments, an operator or master data steward might setup or adjust the operation of a deployment system. For example, FIG. 11 is a human machine interface display 1100 in accordance with some embodiments. The display 1100 includes a graphical representation 1110 of elements of master data curation and classification system (e.g., associated with transaction business data). Selection of an element (e.g., via a touch-screen or computer pointer 1120) may result in display of a pop-up window containing various options (e.g., to adjust rules or logic, assign various devices, change scoring algorithms or a labeling process, etc.). The display 1100 may also include a user-selectable "Setup" icon 1130 (e.g., to configure parameters for master data management as described with respect any of the embodiments of FIGS. 1 through 10).

Figure 12:
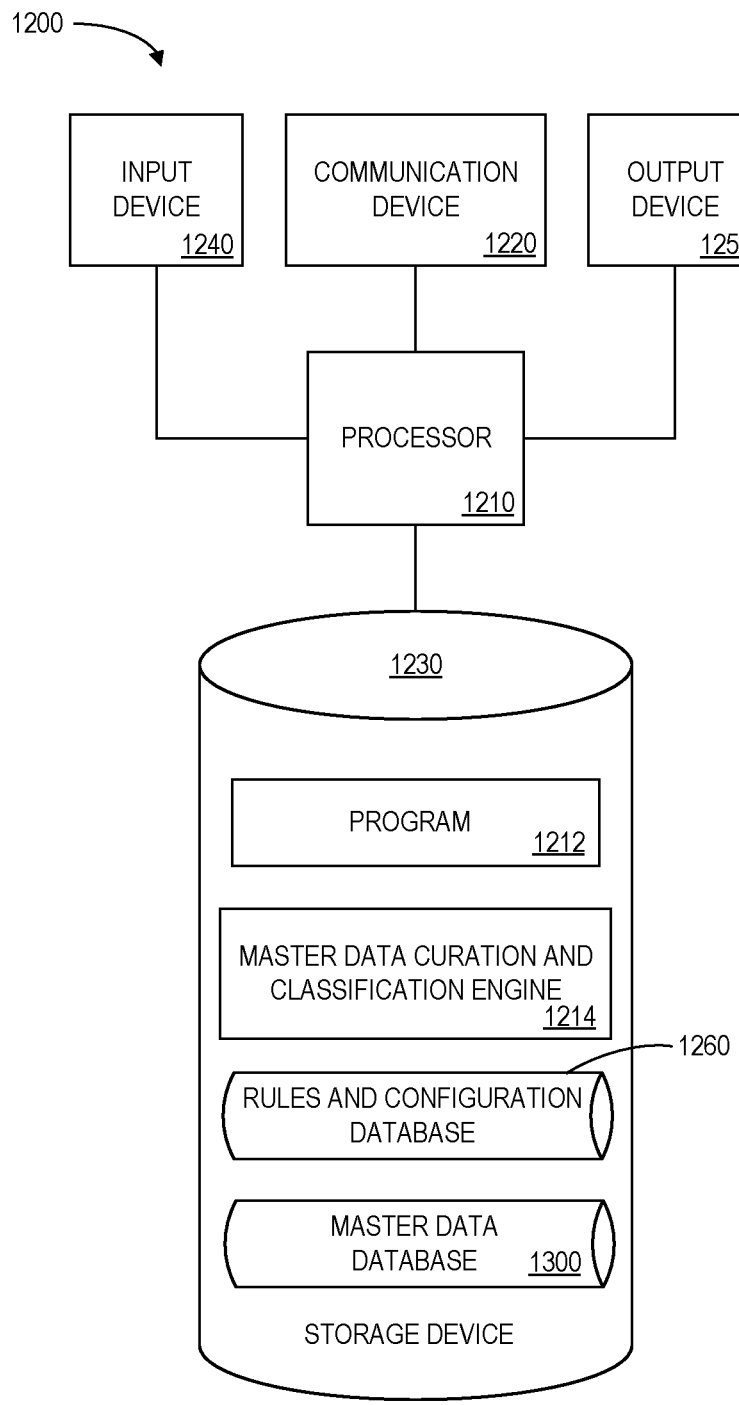
FIG. 12 is an apparatus or platform according to some embodiments.

Note that the embodiments described herein may be implemented using any number of different hardware configurations. For example, FIG. 12 is a block diagram of an apparatus or platform 1200 that may be, for example, associated with the systems 100, 800 of FIGS. 1 and 8, respectively (and/or any other system described herein). The platform 1200 comprises a processor 1210, such as one or more commercially available CPUs in the form of one-chip microprocessors, coupled to a communication device 1220 configured to communicate via a communication network (not shown in FIG. 12). The communication device 1220 may be used to communicate, for example, with one or more remote user platforms, business data sources, etc. The platform 1200 further includes an input device 1240 (e.g., a computer mouse and/or keyboard to input rules or logic) and/an output device 1250 (e.g., a computer monitor to render a display, transmit recommendations or alerts, and/or create enterprise reports). According to some embodiments, a mobile device and/or PC may be used to exchange information with the platform 1200.

The processor 1210 also communicates with a storage device 1230. The storage device 1230 can be implemented as a single database or the different components of the storage device 1230 can be distributed using multiple databases (that is, different deployment information storage options are possible). The storage device 1230 may comprise any appropriate information storage device, including combinations of magnetic storage devices (e.g., a hard disk drive), optical storage devices, mobile telephones, and/or semiconductor memory devices. The storage device 1230 stores a program 1212 and/or a master data curation and classification engine 1214 for controlling the processor 1210. The processor 1210 performs instructions of the programs 1212, 1214, and thereby operates in accordance with any of the embodiments described herein. For example, the processor 1210 might receive transaction business information of an enterprise along with existing structures, rules, and classification recommendations. The processor 1210 may execute supervised machine learning and generate industry agnostic relationship scores and classification scores based on data in the business data database. The processor 1210 may then optimize data and table structures, using relation graph-based evaluation, in accordance with taxonomy data and the classification scores. In some embodiments, the processor 1210 may store the optimized data and table structures. Further, the processor 1210 may identify business configuration data and business rules classification data based on the optimized data and table structures. In some embodiments, the identified business configuration data and business rules classification data are used to automatically update the existing structures, rules, and classification recommendations.

The programs 1212, 1214 may be stored in a compressed, uncompiled and/or encrypted format. The programs 1212, 1214 may furthermore include other program elements, such as an operating system, clipboard application, a database management system, and/or device drivers used by the processor 1210 to interface with peripheral devices.

As used herein, information may be "received" by or "transmitted" to, for example: (i) the platform 1200 from another device; or (ii) a software application or module within the platform 1200 from another software application, module, or any other source.

In some embodiments (such as the one shown in FIG. 12), the storage device 1230 further stores a rules and configuration database 1260 and a master data database 1300. An example of a database that may be used in connection with the platform 1200 will now be described in detail with respect to FIG. 13. Note that the database described herein is only one example, and additional and/or different information may be stored therein. Moreover, various databases might be split or combined in accordance with any of the embodiments described herein.

Figure 13:
FIG. 13 illustrates a master data database in accordance with some embodiments.

Referring to FIG. 13, a table is shown that represents the master data database 1300 that may be stored at the platform 1300 according to some embodiments. The table may include, for example, entries identifying business transaction information. The table may also define fields 1302, 1304, 1306, 1308, for each of the entries. The fields 1302, 1304, 1306, 1308 may, according to some embodiments, specify: a master data identifier 1302, an enterprise identifier 1304, transaction business information 1306, and structures, rules, and classification recommendations 1308. The master data database 1300 may be created and updated, for example, when new business data is received, a business configuration and rules mapper platform updates parameters, etc.

The master data identifier 1302 might be a unique alphanumeric label or link that is associated with a business transaction element. The enterprise identifier 1304 might be associated with a source of the master data, an owner of the master data, etc. The transaction business information 1306 includes specifics about the transaction (date, time, price, parties involved, item identifiers, etc.). The structures, rules, and classification recommendation 1308 might be used, for example, by a business rules framework agent platform to execute supervised machine learning and generate industry agnostic relationship scores and/or classification scores.

Thus, embodiments may allow for improved systems and methods that provide master data classification and curation using machine learning in an efficient and effective manner. The master data management may focus on quality and completeness automatically using graph relationship techniques. Moreover, embodiments may represent a holistic approach towards the dimension of data completeness and data accuracy. The system may also recheck and/or redefine core data optimally to make sure future master data concepts are taken into consideration.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of applications and services, any of the embodiments described herein could be applied to other types of applications and services. In addition, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system associated with transactional master data management for an enterprise, comprising:
   a business data database that stores transaction business information of the enterprise along with existing structures, rules, and classification recommendations;
   a business rules framework agent platform, coupled to the business data database, including:
   a computer processor, and
   a computer memory, coupled to the computer processor, storing computer instructions that, when executed by the computer processor, cause the business rules framework agent platform to:
      execute supervised machine learning and generate industry agnostic relationship scores and classification scores based on data in the business data database; and
      optimize data and table structures, using relation graph-based evaluation, in accordance with taxonomy data and the classification scores;
   a rules and configuration database storing the optimized data and table structures from the business rules framework agent platform;
   a business configuration and rules mapper platform, coupled to the rules and configuration database, to identify business configuration data and business rules classification data based on the optimized data and table structures, wherein the identified business configuration data and business rules classification data are used to automatically update the existing structures, rules, and classification recommendations in the business data database; and
   a scoring module platform to generate an output including a data longevity value, wherein the scoring model platform calculates the longevity value and the updated existing structures, rules, and classification recommendations in the business data database and the output of the scoring module platform are used to classify the transaction business information of the business data database.

2. The system of claim 1, wherein the business rules framework agent platform is further to:
   develop a data transactional limit based on access,
   determine a longevity of the data based on an archiving process,
   determine a classification based on business functions and a data flow,
   evaluate logs for data points associated with misses or errors, and
   optimize rules for optimized accesses.

3. The system of claim 1, wherein the business configuration and rules mapper platform further identifies at least one of: (i) an industry-based classification of business rules, and (ii) a mapping of a configuration to rules.

4. The system of claim 1, further comprising:
   a data classifier platform determining data quality based on at least two of: (i) an accuracy of a business case outcome achievement rate, (ii) an organization of a business case relevance rate, (iii) a completeness rate of missing data counted for a structure, a useableness of a business case mapping count, (iv) a level of detail based traversal levels for a business case, (v) platform query latency, and (vi) a domain score.

5. The system of claim 1, further comprising:
a domain scorer platform receiving at least one of: (i) business process management metadata, (ii) warehouse metadata, and (iii) business source data.

6. The system of claim 5, wherein the domain scorer platform generates at least one of: (i) recommendations, (ii) scores per domain, and (iii) hierarchical level indications.

7. The system of claim 1, further comprising:
a data governance module platform executing a critical scenario evaluation that covers at least one of: (i) data lineage, and (ii) anomaly detection.

8. The system of claim 7, wherein the data governance module platform further scores data based on at least one of: (i) usage, (ii) conformance to a set of rules, and (iii) provenance.

9. The system of claim 1, further comprising:
a labelling module platform that quantifies master data structure change over time based on semantic similarity and label clustering; and
a relationship label database storing an output from the label module platform.

10. The system of claim 1, further comprising at least one of: (i) a domain model platform, (ii) a validation and observation module platform, and (iii) a data segregation abstraction module platform.

11. The system of claim 1,
wherein the output generated by the scoring module platform further comprises at least one of: (i) governance scoring, (ii) identifier scoring, (iii) domain specificity scoring, and (iv) a relevance index.

12. The system of claim 11, wherein the scoring model platform constructs the relevance index by: (i) classifying data using mining, (ii) defining regression coefficients, (iii) recording relevance scoring, and (iv) predicting rules for alignment of master data using relevance scores.

13. The system of claim 1, wherein the scoring model platform further calculates the longevity value using:

$$\ln(A_t/A_i) = -E(A_r)$$

where $A_t$ is an age of access, $A_i$ is an initial age of access, $A_r$ is an archival rate of data, and E is an exponential function to the power of $A_r$.

14. A computer-implemented method associated with transactional master data management for an enterprise, comprising:
receiving, at a business rules framework agent platform, information from a business data database that stores transaction business information of the enterprise along with existing structures, rules, and classification recommendations;
executing, by the business rules framework agent platform, supervised machine learning to generate industry agnostic relationship scores and classification scores based on the received information;
optimizing, by the business rules framework agent platform using relation graph-based evaluation, data and table structures in accordance with the taxonomy data and the classification scores;
storing the optimized data and table structures in a rules and configuration database;
identifying, by a business configuration and rules mapper platform, business configuration data and business rules classification data based on the optimized data and table structures; and
using the identified business configuration data and business rules classification data to automatically update the existing structures, rules, and classification recommendations in the business data database;
generating, by a scoring module platform, an output including a data longevity value; and
classifying the transaction business information of the business data database based on the updated existing structures, rules, and classification recommendations in the business data database and the output of the scoring module platform.

15. The medium of claim 14, wherein business configuration and rules mapper platform further identifies at least one of: (i) an industry-based classification of business rules, and (ii) a mapping of a configuration to rules.

16. The medium of claim 14, wherein a data classifier platform determines data quality based on at least two of: (i) an accuracy of a business case outcome achievement rate, (ii) an organization of a business case relevance rate, (iii) a completeness rate of missing data counted for a structure, a useableness of a business case mapping count, (iv) a level of detail based traversal levels for a business case, (v) platform query latency, and (vi) a domain score.

17. A non-transitory, computer readable medium having executable instructions stored therein, the medium comprising:
instructions to receive, at a business rules framework agent platform, information from a business data database that stores transaction business information of the enterprise along with existing structures, rules, and classification recommendations;
instructions to execute, by the business rules framework agent platform, supervised machine learning to generate industry agnostic relationship scores and classification scores based on the received information;
instructions to optimize, by the business rules framework agent platform using relation graph-based evaluation, data and table structures in accordance with the taxonomy data and the classification scores;
instructions to store the optimized data and table structures in a rules and configuration database;
instructions to identify, by a business configuration and rules mapper platform, business configuration data and business rules classification data based on the optimized data and table structures; and
instructions to use the identified business configuration data and business rules classification data to automatically update the existing structures, rules, and classification recommendations in the business data database;
instructions to generate, by a scoring module platform, an output including a data longevity value; and
instructions to classify the transaction business information of the business data database based on the updated existing structures, rules, and classification recommendations in the business data database and the output of the scoring module platform.

18. The medium of claim 17, wherein a domain scorer platform: (i) receives business process management metadata, warehouse metadata, and business source data, and (ii) generates recommendations, scores per domain, and hierarchical level indications.

19. The medium of claim 17, wherein a data governance module platform: (i) executes a critical scenario evaluation covering data lineage and anomaly detection, and scores data based on usage, conformance to a set of rules, and provenance.

* * * * *